Nov. 9, 1948.  L. C. FRAZIER  2,453,312
EXTRUSION APPARATUS
Filed Sept. 7, 1946  3 Sheets-Sheet 1
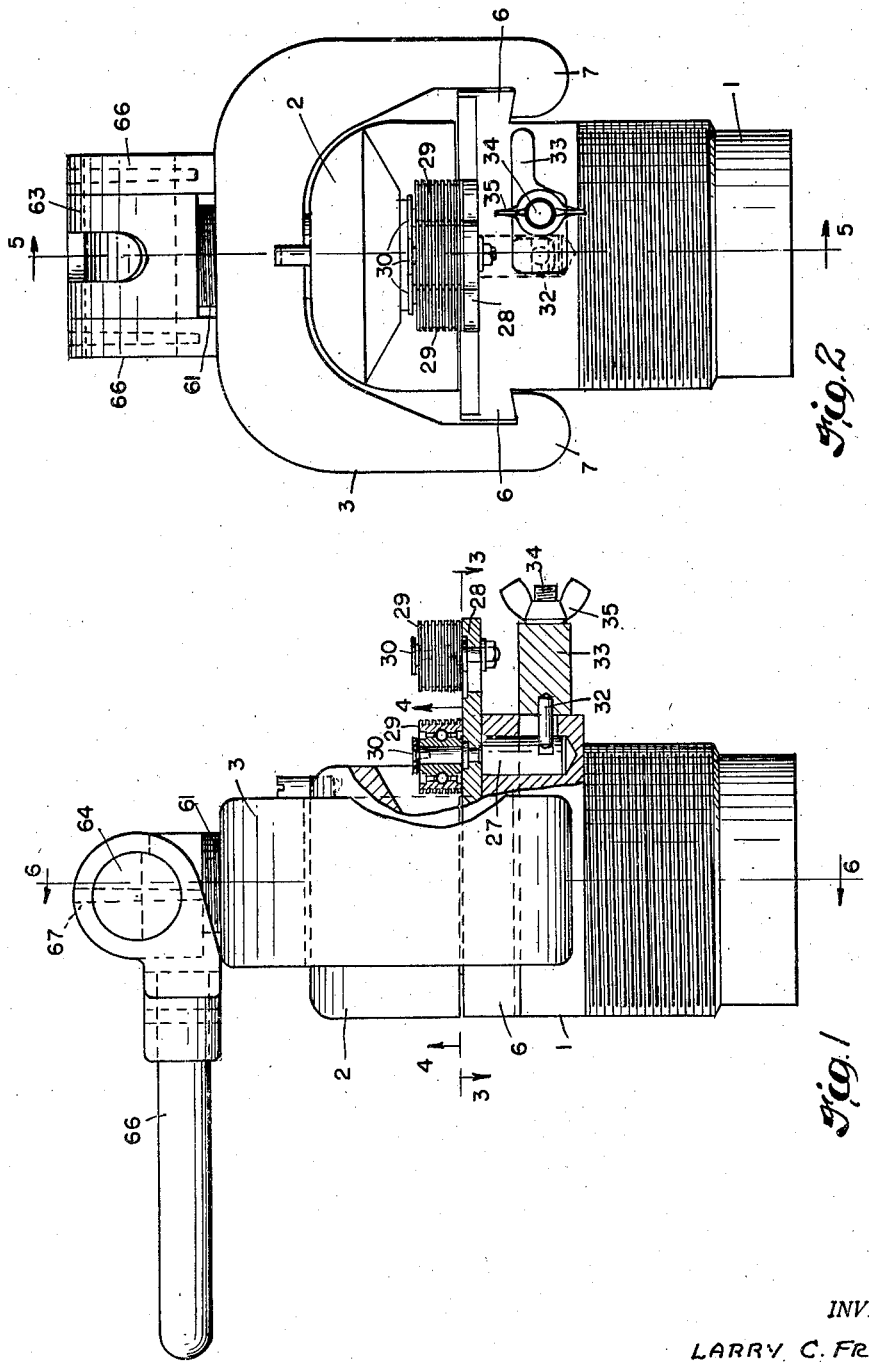
INVENTOR.
LARRY C. FRAZIER
BY
Oberlin & Limbach
ATTORNEYS.

Nov. 9, 1948.                     L. C. FRAZIER                    2,453,312
                                EXTRUSION APPARATUS

Filed Sept. 7, 1946                                            3 Sheets-Sheet 2

INVENTOR.
LARRY C. FRAZIER
BY
Oberlin & Limbach
ATTORNEYS.

Nov. 9, 1948.   L. C. FRAZIER   2,453,312
EXTRUSION APPARATUS
Filed Sept. 7, 1946   3 Sheets-Sheet 3

INVENTOR.
LARRY C. FRAZIER
BY
Oberlin & Limbach
ATTORNEYS.

Patented Nov. 9, 1948

2,453,312

UNITED STATES PATENT OFFICE 2,453,312

EXTRUSION APPARATUS

Larry C. Frazier, Lakewood, Ohio, assignor to National-Standard Company, Niles, Mich., a corporation of Michigan Application September 7, 1946, Serial No. 695,447

14 Claims. (Cl. 18—13)

This invention relates as indicated to extrusion presses and more particularly to the extrusion nozzle associated with presses of the type designed to produce an extruded elongated body having one or a plurality of preformed filaments therein arranged in predetermined relation with respect to each other and with respect to the cross sectional area of the composite end product.

A nozzle of the character to which my invention relates is particularly adapted for use in the manufacture of beads for pneumatic tire casings. Such tire beads usually have a metallic core consisting of a plurality of wires which in one form of structure are merely arranged in parallel with the plastic material forming the body of the bead holding such wires in the desired assembled relation until incorporated in the tire carcass. In one form of bead structure the wires are woven into a tape which is then impregnated and coated with a suitable plastic material such as a rubber composition before the bead is assembled in the tire carcass.

Heretofore, considerable difficulty has been experienced in the operation of extrusion apparatus employed for the purpose of manufacturing tire beads and like devices due to excessive wear on the nozzle as the wire beads and ultimately the extruded mass is passed therethrough. The principal difficulty, however, has been in connection with maintaining the wires in proper predetermined relation, both with respect to each other and with respect to the cross section of the extruded bead. This difficulty has arisen because the plastic material extruded onto and into the bundle of parallel wires has had a tendency to laterally displace the same before the extruded bead was passed through and delivered from the outlet orifice of the die.

It is a principal object of my invention to provide an apparatus which may be used for the stated purpose but in which the enumerated difficulties have been largely overcome.

It is a further and more particular object of my invention to provide an improved construction of the character described which has additional advantages in the provision of adjustable die openings whereby the cross sectional area of the extruded product may be adjusted with a minimum of difficulty and all the parts subjected to wear may be removed and replaced or repaired with a mimimum of effort and loss of time.

It is a further object of my invention to provide a construction in which the various parts thereof are so arranged that hard metal inserts of simple shapes may be employed for the purpose of providing the principal wearing surfaces of the structure.

It is still a further object of my invention to provide a structure of the character described in which the facility for clamping together the sections of the die and for "bleeding" the die when the occasion arises are combined into a single element, thus not only reducing the cost and simplifying the construction but also improving the facility with which the assembly may be manipulated.

It is still a further object of my invention to provide a novel arrangement of guide means for the wire entering the die so as to insure that there will always be the proper alignment between the wires and the passage therefor through the die, thus minimizing wear and further insuring proper arrangement of the wires with respect to each other and the cross sectional area of the extruded mass within which such wires are ultimately incorporated.

Other objects of the invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is an elevational view partially in section of an assembly constructed in accordance with the principles of my invention;

Fig. 2 is another elevational view of such assembly taken from the right-hand side of Fig. 1;

Referring now more specifically to the drawings and more especially to Figs. 1 and 2, the assembly here illustrated as one embodiment of my invention comprises three main parts, a body member generally indicated at 1, a cap member generally indicated at 2, and a clamping assembly generally indicated at 3 and by which the members 1 and 2 are removably clamped in assembled relation.

Figure 6:
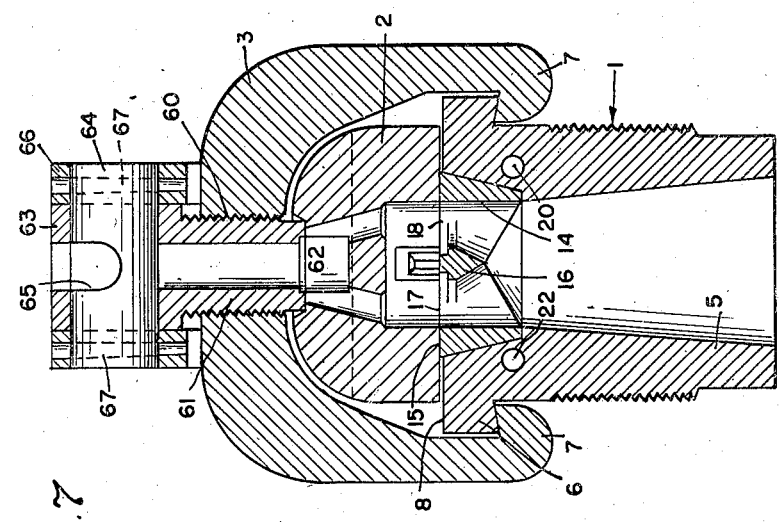
Fig. 6 is a vertical section through the assembly illustrated in Fig. 1 taken on a plane substantially indicated by the line 6—6.
Figure 5:
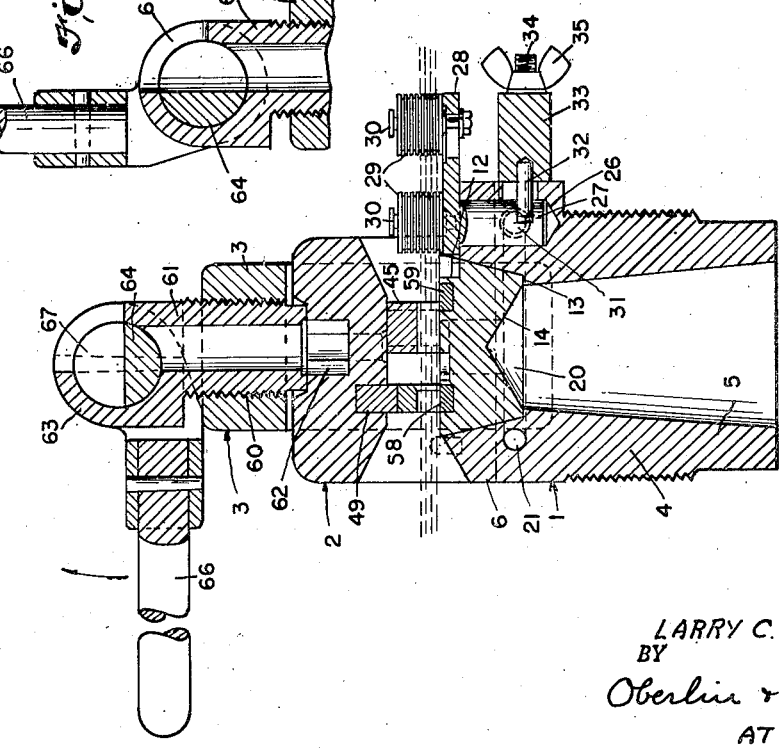
Fig. 5 is a vertical section through the assembly illustrated in Fig. 2 taken on a plane substantially indicated by the line 5—5.

The member 1, as most clearly illustrated in Figs. 5 and 6, comprises a tubular body having a lower externally threaded portion 4 and having an internal bore generally indicated at 5 through which the plastic material to be extruded is fed to the extrusion die or nozzle of my invention. The lower portion 4 of the body 1 is cylindrical and the upper portion 6 thereof is substantially rectangular providing on opposite sides of the body 1 lateral extensions adapted to receive the hooks 7 on the lower ends of the clamping yoke 3. The upper surface 8 of the lower member 1 is substantially planar. However, as most clearly illustrated in Fig. 3, that portion bounded by the lines 9, 10 and 11 is on a plane lower than the remainder of the upper face by an amount equal to the length of the line 12 in Fig. 5.

The upper end of the passage 5 is flared outwardly from a radial seat 13, being substantially coniform to receive a coniform insert 14, the axial extent of which is such that the upper face 15 thereof is slightly above the planar face 8 of the lower member 1 so that when the upper member 2 is clamped to the lower member by means of the yoke 3, the coniform insert 14 will be clamped to and held on the seat 13.

Figure 3:
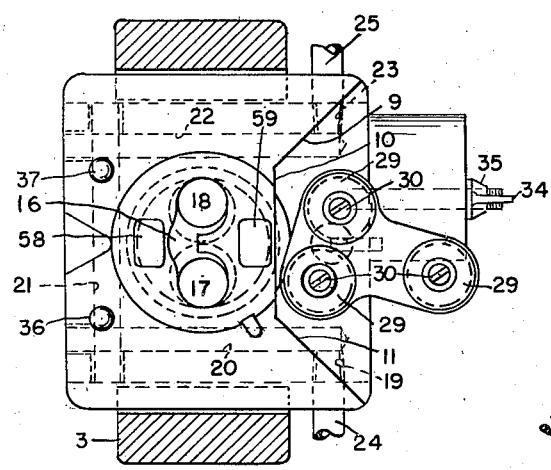
Fig. 3 is a transverse sectional view of the assembly illustrated in Fig. 1 taken on a plane substantially indicated by the horizontal sectional line drawn thereacross and when viewed in the direction indicated by the arrows 3—3.

As most clearly illustrated in Figs. 5, 6 and 3, the coniform insert 14 has a bridge 16 across the axial opening therethrough, so as to provide two laterally spaced feed openings 17 and 18. The upper surface of the bridge wall 16 is preferably on a plane somewhat lower than the plane 15 defining the upper surface of the coniform insert 14 for the purpose hereinafter more fully explained.

As most clearly illustrated in Fig. 3, the lower member 1 is provided with a series of drilled passages 19, 20, 21, 22 and 23 extending therethrough so that by the attachment of suitable fluid conduits, such as 24 and 25, thereto, a temperature modified medium such as a heating fluid may be circulated through the die for the purpose of heating it to insure that the material to be extruded will be maintained at a proper flowable temperature.

The lower member 1 in the area of the lower plane on the upper face thereof defined by the lines 9, 10 and 11 is provided with a vertically extending opening 26, in which is rotatably mounted a pin 27, which on its upper end carries a plate 28. On the plate 28 are mounted three peripherally grooved rollers 29 which are rotatable about the pins 30 on which they are mounted, these rollers serving as guide means in the manner hereinafter more fully explained for the wire entering the die. The pin 27 is provided with a transverse slot 31 into which extends a pin 32 carried by a plate 33. The plate 33 is secured to the member 1 by means of a terminally threaded stub shaft 34 which extends rotatably through an opening in the plate 33. The wing nut 35 threaded on the end of the stub shaft 34 is adapted to clamp the plate against the member 1 in any one of a series of adjusted positions so that as the plate 33 is rotated about the axis of the shaft 34, the pin 32 is raised or lowered, effecting a vertical adjustment of the rollers 29. The plate 33 is held in adjusted position by tightening the wing nut 35.

On the upper surface 8 of the lower member 1 there are provided two dowels 36 and 37 which serve as rotating means to insure proper alignment between the lower member 1 and the upper member 2, when such members are clamped in assembled relation by means of the yoke 3.

Figure 4:
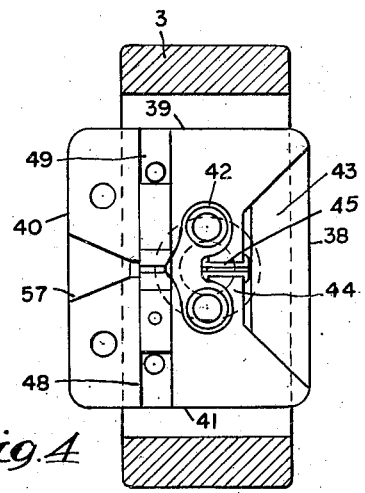
Fig. 4 is a transverse sectional view of the assembly shown in Fig. 1 taken on the same sectional plane described above but when viewed in a direction indicated by the arrows 4—4.
Figure 8:
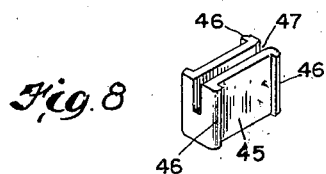
Fig. 8 is a perspective of the dam insert forming one of the elements of the previously illustrated assembly and the arrangement and location of which in such assembly is most clearly illustrated in Fig. 4.

The upper or cap member 2 is substantially rectangular in cross section and its cross sectional configuration is defined in general by the lines 38, 39, 40 and 41 on Fig. 4. Centrally of the cap member 2 on its lower face there is provided a recess generally indicated at 42, which, when the cap member is mounted on the lower member 1 in the manner illustrated in Figs. 5 and 6, provides a cavity to which the material to be extruded is fed in separate streams through the openings 17 and 18 in the insert 14. The cap member 2 has a recess generally indicated at 43 formed in one side thereof, and extending through the wall 44 dividing such recess and the cavity 42 is a slot in which is mounted a dam insert generally indicated at 45, and the construction of which is most clearly shown in Fig. 8. The dam insert is provided with flanges such as 46 at its opposite ends for the purpose of securing it in the slot in the partition 44. The dam insert 45 is itself provided with a slot 47, which, when such insert is in engagement with the body portion 1, provides a laterally circumscribed opening through which the wires or filaments may pass into the extrusion cavity 42. The size and shape of the slot 47 will be determined by the nature of the product to be extruded.

Figures 9, 11:
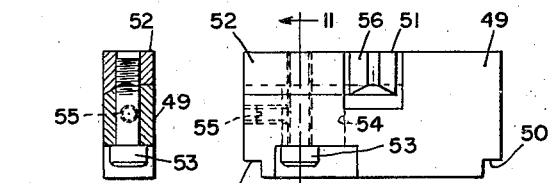
Fig. 9 is a side elevation of the adjustable gauging insert which forms one of the elements of the combination previously illustrated and the position and location of which are most clearly illustrated in Fig. 4.
Fig. 11 is a transverse sectional view of such insert taken on a plane substantially indicated by the line 11—11 in Fig. 9.
Figure 10:
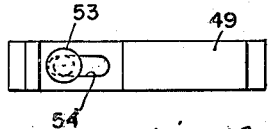
Fig. 10 is a plan view of the insert illustrated in Fig. 9.

The lower face of the cap member 2 is provided with a transverse slot 48 in which is mounted a gauging insert 49, the construction of which is most clearly illustrated in Figs. 9 and 10.

The gauge insert 49 comprises a rectangular block with cut away portions 50 at its lower corners which fit over complementary projections in the opposite ends of the bottom of the groove 48 and assist in holding the insert 49 in place when the parts are assembled as shown in Figs. 5 and 6. The insert 49 is provided with a hard metal insert 51 formed of a hard wear-resistant material, such as tungsten carbide. Adjacent the insert 51 there is adjustably supported a slide 52 held in desired position on the body of the insert 49 by means of a cap screw 53 which extends upwardly through a vertical slot 54, and is threaded into a threaded opening in the slide 52. Adjustment of the slide 52 laterally, as viewed in Fig. 9, is effected by means of a set screw 55 mounted in the threaded hole in the end of the body 49. By loosening the cap screw 53 sufficiently to permit the slide 52 to move, the set screw 55 may then be adjusted to provide a desired size of slot between the forward end 56 of the slide 52 and the hard metal insert 51. At this point it should be noted that the forward end 56 of the slide member 52 is also preferably formed of a hard wear-resistant material such as tungsten carbide.

A relieved area 57, formed in the lower face of the cap 2 opposite the central portion of the gauging insert 49, provides the opening through which the extruded product is ejected during the normal operation of the apparatus and when the parts are in assembled relation as illustrated in Figs. 5 and 6.

By having reference to Fig. 3, it will be noted that the insert 14 is provided with spaced inserts 58 and 59 which are respectively arranged to be opposite the openings or slots in the gauging and dam inserts carried by the cap 2. These inserts or pads 58 and 59 are also preferably formed of a suitable hard wear-resistant material such as tungsten carbide. The dam insert 45 is also preferably formed of a hard wear-resistant material such as tungsten carbide. Thus, it will be observed that both the dam and gauging openings, which respectively lead into and out of the extrusion cavity 42, are bounded by hard wear-resistant materials of simple construction and such form that they may be readily replaced if any wear does occur.

The yoke or clamping assembly, generally indicated at 3, comprises a main yoke with hooks 7 at its lower ends, as previously explained, and centrally of the yoke there is a threaded hole 60 into which is threaded a hollow or tubular screw 61 adapted to engage the cap 2 at a point where the latter is also provided with an opening 62 leading into the extrusion cavity 42.

Figure 7:
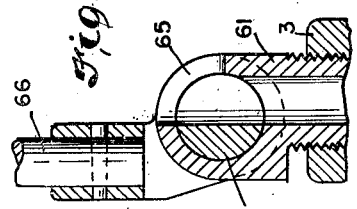
Fig. 7 is an enlarged view of the upper portion of the assembly as illustrated in Fig. 5 but showing the parts in a somewhat different relationship.

The upper end of the member 61 is provided with a valve head comprising a generally cylindrical portion 63 in which is mounted a barrel 64. The barrel 64 is provided with a relieved portion 65 and the part 63 is also provided with a relieved portion or opening adapted to register with the relieved portion 65 in the barrel 64. The barrel 64 is adapted to be rotated by means of a forked handle generally indicated at 66 which is pinned to the opposite ends of the barrel 64 by pins 67. When the handle 66 is in the position illustrated in Fig. 5, the passage upwardly through the member 61 from the extrusion cavity 42 is blocked by the barrel 64. However, when the handle 66 is in the position illustrated in Fig. 7, such passage is open and the material being worked upon may pass upwardly through the member 61 and out of the discharge opening 65 for the purposes hereinafter more fully explained. By having the handle 66 connected in the manner illustrated and described, it serves a dual function, i. e. that of manipulating the valve, and when in the position illustrated in Fig. 5 may be used for the purpose of rotating the threaded member 61, which, when forced against the upper face of the cap 2, draws the hooks 7 of the clamp 3 into engagement with the lugs 6 thereby maintaining all of the parts in the assembled relation illustrated in Figs. 5 and 6.

In operation, the parts will be assembled in the manner illustrated in Figs. 1, 2, 5 and 6. A supply of plastic material will be fed upwardly under pressure through the opening 5, where it will be divided into separate streams by the passages 17 and 18 and forced into the extrusion cavity 42 on opposite sides of a line which passes through the dam insert 45 and the gauging insert 49. The filament which is to be incorporated in the extruded elongated end product is then introduced through the dam insert 45, which will have a slot 47 of such size as to snugly engage the filament so as to prevent the plastic mass in the extrusion cavity 42 from flowing backwardly through the dam insert opening. The filament passing outwardly through the gauging die or nozzle will be embedded in the plastic mass which is extruded therearound and issues therewith from the gauging opening between the elements 51, 56 and 58. When, for example, a tire bead is being made of a plurality of parallel wires, then the rollers 29 will be employed and the wires maintained in predetermined relation by the grooves on the periphery of the rollers 29. At this point, it should be noted that the rollers 29 are so arranged that a line drawn tangent to the two rollers occupying the lowermost positions as viewed in Fig. 3 will extend chord-wise to a slight extent across the roller which occupies the uppermost position as viewed in Fig. 3. The arrangement of the rollers is such that the parallel wires are fed directly into the opening or slot 47 in the dam insert 45 and without binding against the sides or edges of such opening. The wires thus being held in predetermined spaced relation by the grooves or serrations on the rollers 29 and with the plastic material flowing against such wires from opposite sides, because of being fed as separate streams through the openings 17 and 18, will result in a finished product in which the wires are embedded in the desired predetermined relation and without any undue distortion which would occur were the plastic material to be fed to such wires in a single stream from any one side.

As previously indicated, the adjustment of the bundle of wires vertically may be effected by a manipulation of the thumb screw 35 and the block 33, which, through pin 32, raises and lowers the pin 27 on which the bracket supporting the rollers is carried.

When making a tire bead of a woven strand of wires, it is not necessary to use the rollers 29 since the structure of the woven band is such as to inherently retain the component wires thereof in the desired predetermined relationship until they are finally embedded in the extruded member ejected from the gauging die.

As previously indicated, the upper surface of the partition 16 between the openings 17 and 18 is slightly lower than the plane which defines the upper surface of the coniform insert 14 so that the material to be extruded may pass from either side of the bundle of filaments into the space below such bundle as well as into the space above such bundle. This arrangement insures that the bundle of filaments will be fully impregnated but without any distortion of the same relatively to each other. Likewise, the bundle of filaments will be permitted to pass through the gauging die centrally of the opening in such die so that the filaments will be properly positioned relative to the cross sectional area of the extruded composite product.

When, for some reason, it is desired to interrupt the extrusion process without shutting down the machine or removing the strand from the extrusion head, this can be accomplished by merely opening the valve actuated by the handle 66 which will permit the plastic mass to flow upwardly through the extrusion cavity 42, which movement of material will be sufficient to prevent the plastic mass from "freezing" and blocking the die. When the extrusion operation is to be resumed, the valve manipulated by the handle 66 will then be closed and the extrusion operation can be resumed without the necessity of dismantling and cleaning the die.

Throughout the foregoing description, I have referred to the use of my improved apparatus for the purpose of making extruded reinforced beads useful in the manufacture of pneumatic tire casings. My apparatus is useful, however, for the production of a wide variety of extrusion products. One particular product which may be very advantageously made by the use of my apparatus is an elongated element of thermoplastic material reinforced by a plurality of longitudinally extending glass fibers or cords embedded therein. Similarly, my apparatus may be used in the manufacture of multiconductor electrical cables in which a plurality of conductors are embedded in spaced relation in an extruded insulating medium.

Other modes of applying the principle of the invention may be employed, change being made as regards the details described, provided the features stated in any of the following claims or the equivalent of such be employed.

I, therefore, particularly point out and distinctly claim as my invention:

1. A nozzle for the extrusion of a plastic mass into an elongated body, comprising complementary body and cap members, whose opposed faces when in engagement define a forming cavity, a gauging insert carried by one of said members, forming a portion of the wall of said cavity and provided with a slot therethrough of a cross-section equal to the desired cross-section of the elongated body to be formed, said cavity including openings adapted to admit separate streams of material to said cavity on opposite sides of the slot in said insert, and means for clamping said members in assembled relation.

2. A nozzle for the extrusion of a plastic mass into an elongated body, comprising complementary body and cap members, whose opposed faces when in engagement define a forming cavity, a gauging insert carried by one of said members, forming a portion of the wall of said cavity and provided with relatively movable members defining an adjustable slot therethrough of a variable cross-section to define the cross-section of the elongated body to be formed, and means for clamping said members in assembled relation.

3. A nozzle for the extrusion of a plastic mass into an elongated body having a preformed filament therein, comprising complementary body and cap members whose opposed faces are adapted to engage one another, one of which is provided with a recess which when said opposed faces are in engagement comprises a cavity, a dam insert carried by the member having said recess, forming a portion of the wall of said recess and provided with a slot therethrough of such width and depth as to admit said filament, a gauging insert carried by the member having said recess, forming a portion of the wall of said recess opposite to said dam insert and provided with a slot therethrough of a cross-section equal to the desired cross-section of the elongated body to be formed, the other of said members provided with an opening into said cavity to admit the material to be extruded, and means clamping said members in engagement.

4. A nozzle for the extrusion of a plastic mass into an elongated body having a preformed filament therein in predetermined relation, comprising complementary body and cap members whose opposed faces when in engagement define a forming cavity, a dam insert carried by one of said members forming a portion of the wall of said cavity and provided with an opening therethrough adapted to admit said filament, a gauging insert carried by said first-mentioned member forming a portion of the wall of said cavity opposite to said dam insert and provided with an opening therethrough of a cross-section equal to the desired cross-section of the elongated body to be formed, said cavity including openings adapted to admit separate streams of material to said cavity on opposite sides of a line passing through the openings in said dam and gauging inserts respectively, and means for clamping said members in assembled relation.

5. A nozzle for the extrusion of a plastic mass into an elongated body having a preformed filament therein in predetermined relation, comprising complementary body and cap members whose opposed faces when in engagement define a forming cavity, a dam insert carried by one of said members forming a portion of the wall of said cavity and provided with an opening therethrough adapted to admit said filament, a gauging insert carried by said first named member forming a portion of the wall of said cavity opposite to said dam insert and provided with an opening therethrough of a cross-section equal to the desired cross-section of the elongated body to be formed, and a feed insert in the other of said members forming still another portion of the wall of said cavity and provided with openings adapted to admit separate streams of material to said cavity on opposite sides of a line passing through the openings in said dam and gauging inserts respectively, and means for clamping said members in assembled relation.

6. A nozzle for the extrusion of a plastic mass into an elongated body having a plurality of preformed filaments therein in predetermined relation, comprising complementary body and cap members whose opposed faces are adapted to engage one another, one of which is provided with a recess which when said opposed faces are in engagement comprises a cavity, a dam insert carried by the member having said recess, forming a portion of the wall of said recess and provided with a slot therethrough of such width and depth as to admit said filaments, a gauging insert carried by the member having said recess, forming a portion of the wall of said recess opposite to said dam insert and provided with a slot therethrough of a cross-section equal to the desired cross-section of the elongated body to be formed, the other of said members provided with openings in the bottom of said cavity adapted to admit separate streams of material to said cavity on opposite sides of a line passing through the slots in said dam and gauging inserts respectively, a swiveled carrier removably supported on said second named member and rotatably supporting a plurality of peripherally grooved rollers on laterally spaced parallel axes so arranged as to guide the filaments in predetermined relation into the opening in said dam insert, and means adapted to clamp said members in assembled relation.

7. A nozzle for the extrusion of a plastic mass into an elongated body having a plurality of preformed filaments therein in predetermined relation, comprising complementary body and cap members whose opposed faces are adapted to engage one another, one of which is provided with a recess which when said opposed faces are in engagement comprises a cavity, a dam insert carried by the member having said recess, forming a portion of the wall of said recess and provided with a slot therethrough of such width and depth as to admit said filaments, a gauging insert carried by the member having said recess, forming a portion of the wall of said recess opposite to said dam insert and provided with a slot therethrough of a cross-section equal to the desired cross-section of the elongated body to be formed, the other of said members provided with openings in the bottom of said cavity adapted to admit separate streams of material to said cavity on opposite sides of a line passing through the slots in said dam and gauging inserts respectively, a swiveled carrier removably supported on said second-named member and rotatably supporting a plurality of peripherally grooved rollers on laterally spaced parallel axes so arranged as to guide the filaments in predetermined relation into the opening in said dam insert, means adapted to clamp said members in assembled relation with said inserts engaging portions of the walls of said cavity in such manner that the slots in said inserts become laterally confined openings, and inserts of hard metal composition on those portions of the walls of said cavity which when said members are in engagement define said laterally confined openings.

8. A nozzle for the extrusion of a plastic mass into an elongated body having a plurality of preformed filaments therein in predetermined relation, comprising complementary body and cap members whose opposed faces are adapted to engage one another, one of which is provided with a recess which when said opposed faces are in engagement comprises a cavity, a dam insert carried by the member having said recess, forming a portion of the wall of said recess and provided with a slot therethrough of such width and depth as to admit said filaments, a gauging insert carried by the member having said recess, forming a portion of the wall of said recess opposite to said dam insert and provided with a slot therethrough of a cross-section equal to the desired cross-section of the elongated body to be formed, the member having said recess provided with openings in the bottom of said recess adapted to admit separate streams of material to said cavity on opposite sides of a line passing through the slots in said dam and gauging inserts respectively, a swiveled carrier removably supported on said second-named member and rotatably supporting a plurality of peripherally grooved rollers on laterally spaced parallel axes so arranged as to guide the filaments in predetermined relation into the opening in said dam insert, a yoke adapted to clamp said members in assembled relation with said inserts engaging portions of the walls of said cavity in such manner that the slots in said inserts become laterally confined openings, and inserts of hard metal composition on those portions of the walls of said cavity which when said members are in engagement define said laterally confined openings.

9. A nozzle for the extrusion of a plastic mass into an elongated body, comprising complementary body and cap members whose opposed faces when in engagement define a forming cavity with a discharge opening leading therefrom, an insert in one of said members forming a portion of the wall of said cavity and provided with openings adapted to admit a stream of material to said cavity, said insert being coniform and seating in a coniform opening which is progressively enlarged in the direction of flow of material to be extruded, and means to clamp said members in assembled relation.

10. A nozzle for the extrusion of a plastic mass into an elongated body, comprising complementary body and cap members whose opposed faces when in engagement define a forming cavity with a discharge opening leading therefrom, one of said members provided with a feed opening leading to said cavity, a yoke adapted to clamp said members in assembled relation, a hollow screw threaded through said yoke and adapted to bear against one of said members to exert a clamping action thereon, said last named member provided with an opening establishing communication between the interior of said screw and said cavity, a valve in said screw and a handle for said valve whereby said valve may be manipulated and said screw rotated in said clamp.

11. A nozzle for the extrusion of a plastic mass into an elongated body having a preformed filament therein in predetermined relation, comprising complementary body and cap members whose opposed faces when in engagement define a forming cavity, a dam insert carried by one of said members forming a portion of the wall of said cavity and provided with an opening therethrough adapted to admit said filament, a gauging insert carried by said first-named member forming a portion of the wall of said cavity opposite to said dam insert and provided with an opening therethrough of a cross-section equal to the desired cross-section of the elongated body to be formed, and a feed insert in the other of said members forming still another portion of the wall of said cavity and provided with openings adapted to admit separate streams of material to said cavity on opposite sides of a line passing through the openings in said dam and gauging inserts respectively, a swiveled carrier removably supported on said second-named member and rotatably supporting a plurality of peripherally grooved rollers supported on laterally spaced parallel axes so arranged as to guide the filament in predetermined relation into the opening in said dam insert, a yoke adapted to clamp said members in assembled relation, a tubular screw threaded through said yoke and adapted to bear against one of said members to exert a clamping action thereon, said last named member provided with an opening establishing communication between the interior of said screw and said cavity, a valve in said screw and a handle for said valve whereby said valve may be manipulated and said screw rotated in said clamp.

12. A nozzle for the extrusion of a plastic mass into an elongated body having a plurality of preformed filaments therein in predetermined relation, comprising complementary body and cap members, whose opposed faces are adapted to engage one another one of which is provided with a recess which when said opposed faces are in engagement comprises a cavity, a dam insert carried by the member having said recess, forming a portion of the wall of said recess and provided with a slot therethrough of such width and depth as to admit said filaments, a gauging insert carried by the member having said recess, forming a portion of the wall of said recess opposite to said dam insert and provided with a slot therethrough of a cross-section equal to the desired cross-section of the elongated body to be formed, the member having said recess provided with openings in the bottom of said recess adapted to admit separate streams of material to said cavity on opposite sides of a line passing through the slots in said dam and gauging inserts respectively, a swiveled carrier removably supported on the other of said members and rotatably supporting a plurality of peripherally grooved rollers on laterally spaced parallel axes so arranged as to guide the filaments in predetermined relation into the opening in said dam insert, a yoke adapted to clamp said members in assembled relation with said inserts engaging portions of the walls of said cavity in such manner that the slots in said inserts become laterally confined openings, inserts of hard metal composition on those portions of the walls of said cavity which when said members are in engagement define said laterally confined openings, a tubular screw threaded through said yoke and adapted to bear against one of said members to exert a clamping action thereon, said last named member provided with an opening establishing communication between the interior of said screw and said cavity, a valve in said screw and a handle for said valve whereby said valve may be manipulated and said screw rotated in said clamp.

13. A nozzle for the extrusion of a plastic mass into an elongated body, comprising complementary body and cap members whose opposed faces when in engagement define a forming cavity, one of said faces being generally annular in form interrupted by a slot from the inside edge to the outside edge thereof of width and depth corresponding to the desired cross-section of the elongated body to be formed, one of said members provided with an opening leading into said cavity adapted to admit a stream of the material to be extruded, and means for clamping said members in assembled relation with the other of said opposed faces engaging said annular face and thereby defining with said slot a laterally confined opening.

14. A nozzle for the extrusion of a plastic mass into an elongated body having a filament therein, comprising complementary body and cap members whose opposed faces when in engagement define a forming cavity, one of said faces being generally annular in form interrupted by a pair of oppositely disposed slots extending from the inside edge to the outside edge thereof of width and depth respectively admitting said filament into said cavity and corresponding to the desired cross-section of the elongated body to be formed, one of said members provided with openings adapted to admit separate streams of material to said cavity on opposite sides of a line passing through said slots, and means for clamping said members in assembled relation with the other of said opposed faces engaging said annular face and thereby defining with said slots laterally confined openings.

LARRY C. FRAZIER.

REFERENCES CITED

The following references are of record in the file of this patent:

UNITED STATES PATENTS

| Number | Name | Date |
|---|---|---|
| 515,951 | Cobb | Mar. 6, 1894 |
| 830,201 | Blondel | Sept. 4, 1906 |
| 1,100,002 | Van Ness | June 16, 1914 |
| 1,393,860 | Weeks | Oct. 18, 1921 |
| 1,770,969 | Cherry | July 22, 1930 |
| 2,035,247 | Royle | Mar. 24, 1936 |
| 2,105,812 | Gordon et al. | Jan. 18, 1938 |
| 2,185,701 | Boyle | Jan. 2, 1940 |